United States Patent [19]

Takata et al.

[11] Patent Number: 5,457,671
[45] Date of Patent: Oct. 10, 1995

[54] METHOD AND CIRCUIT FOR CORRECTING TRACK ZERO CROSSING SIGNAL IN OPTICAL TRACK

[75] Inventors: Hidekazu Takata; Shigenori Yanagi, both of Kawasaki, Japan

[73] Assignee: Fujitsu Limited, Kawasaki, Japan

[21] Appl. No.: 338,892

[22] Filed: Nov. 14, 1994

Related U.S. Application Data

[63] Continuation of Ser. No. 851,473, Mar. 13, 1992, abandoned.

[30] Foreign Application Priority Data

Mar. 19, 1991 [JP] Japan .................................. 3-080970

[51] Int. Cl.$^6$ .................................................. G11B 7/085
[52] U.S. Cl. ..................................... 369/44.28; 369/44.32; 369/54
[58] Field of Search ........................... 369/44.28, 44.32, 369/44.27, 32, 41, 44.11, 44.29, 33, 54, 44.25, 44.34, 124, 58; 360/78.05, 78.04, 78.02, 77.02, 51, 46

[56] References Cited

U.S. PATENT DOCUMENTS

| | | | |
|---|---|---|---|
| 4,663,752 | 5/1987 | Kakuse et al. ................................. | 369/54 |
| 4,817,077 | 3/1989 | Ono ................................................ | 369/54 X |
| 4,833,664 | 5/1989 | Shiragami et al. ........................ | 369/44.25 X |
| 4,899,325 | 2/1990 | Katsuhara et al. ........................ | 369/32 X |
| 4,982,110 | 1/1991 | Yokogawa et al. ......................... | 369/48 X |
| 4,989,190 | 1/1991 | Kuroe et al. .................................. | 369/32 |
| 5,038,333 | 8/1991 | Chow et al. ................................. | 369/44.28 |
| 5,042,019 | 8/1991 | Kitai et al. .................................... | 369/32 |
| 5,063,549 | 11/1991 | Yamamuro ................................ | 369/44.28 |
| 5,146,440 | 9/1992 | Yamaguchi et al. .................... | 369/44.34 X |
| 5,157,645 | 10/1992 | Takahara et al. ...................... | 369/44.34 X |
| 5,172,353 | 12/1992 | Ito ................................................. | 369/44.28 |
| 5,216,651 | 6/1993 | Hwang ....................................... | 369/44.28 |

FOREIGN PATENT DOCUMENTS

| | | |
|---|---|---|
| 0401973 | 12/1990 | European Pat. Off. . |
| 60-145576 | 8/1985 | Japan . |
| 60-171637 | 9/1985 | Japan . |
| 60-256991 | 12/1985 | Japan . |
| 1023472 | 1/1989 | Japan . |
| 64-23471 | 1/1989 | Japan . |
| 6442079 | 2/1989 | Japan . |
| 1-98169 | 4/1989 | Japan . |
| 1277378 | 7/1989 | Japan . |
| 1276474 | 11/1989 | Japan . |
| 2058736 | 2/1990 | Japan . |
| 2-137129 | 5/1990 | Japan . |

Primary Examiner—W. R. Young
Assistant Examiner—Thang V. Tran
Attorney, Agent, or Firm—Greer, Burns & Crain

[57] ABSTRACT

In order to correct a track zero-crossing signal TZC generated from a signal detected by an optical head of an optical disk system, an expected edge pulse and a window signal are generated at the position at which the appearance of the edge of the track zero-crossing signal is expected. Among the edge pulses of the actual track zero-crossing signal, only those that exist inside a window are allowed to pass through. When the edge pulses do not exist within the window, the expected pulse is inserted so as to generate a corrected edge pulse, and a corrected track zero-crossing signal is generated from this corrected edge pulse.

15 Claims, 14 Drawing Sheets

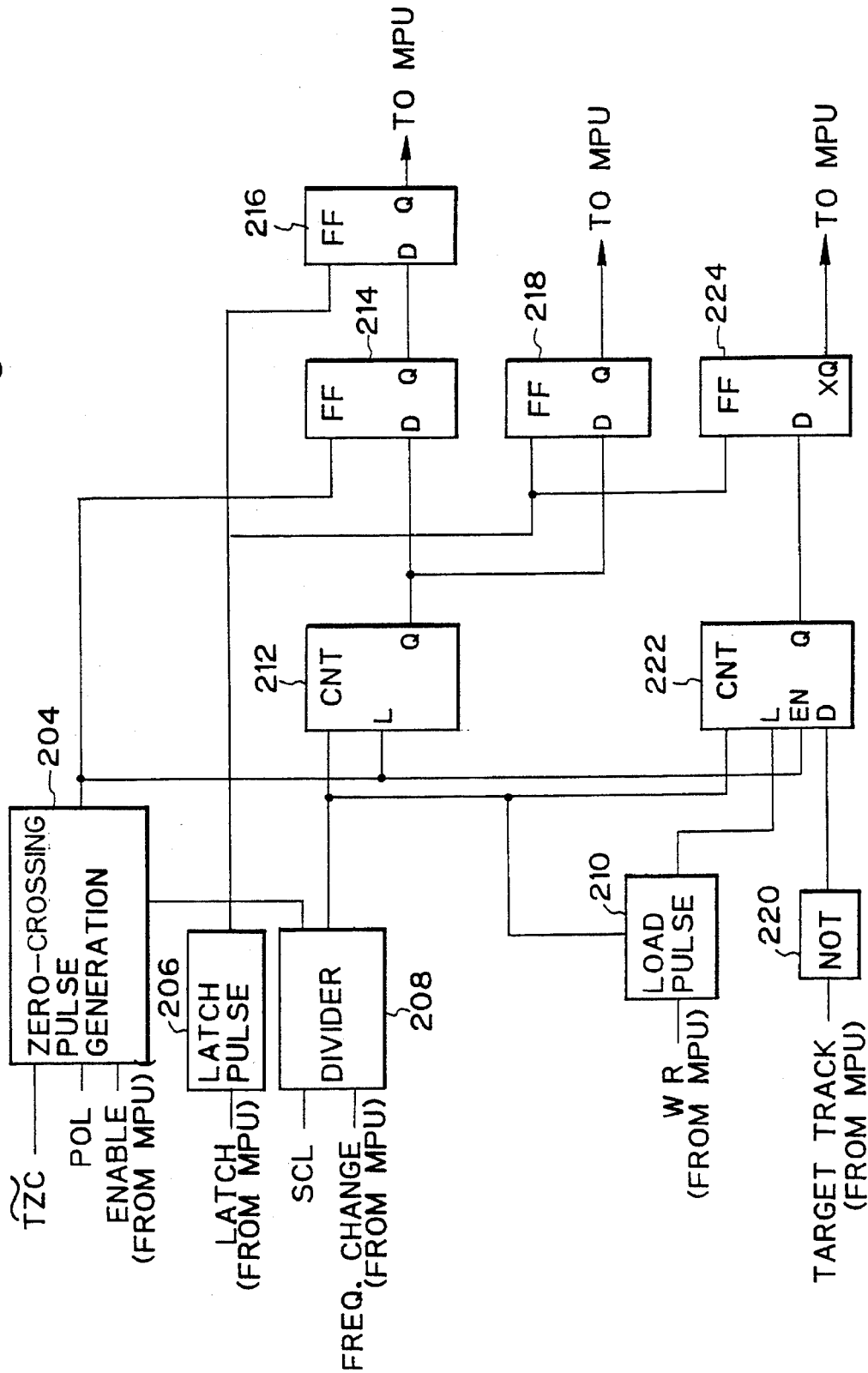

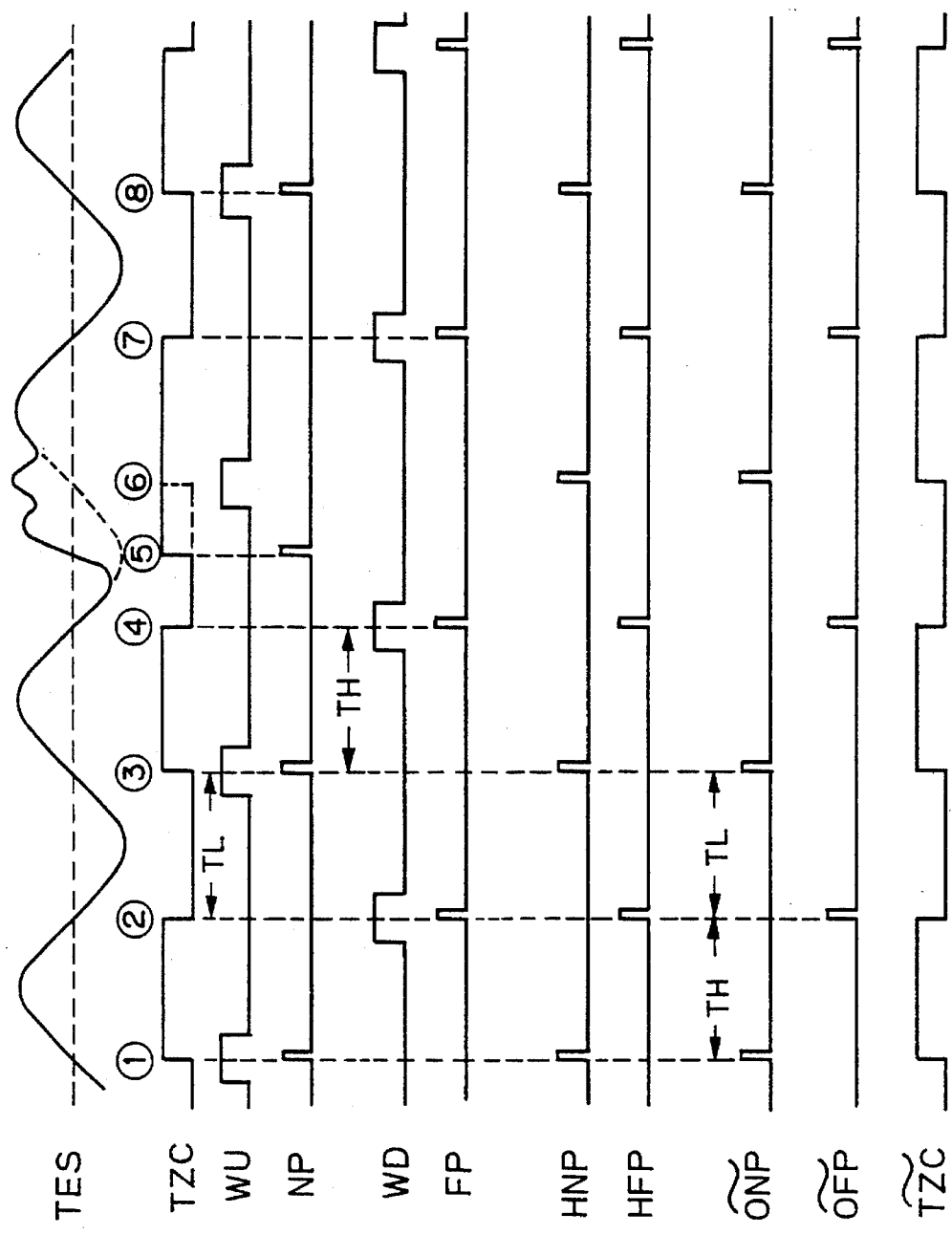

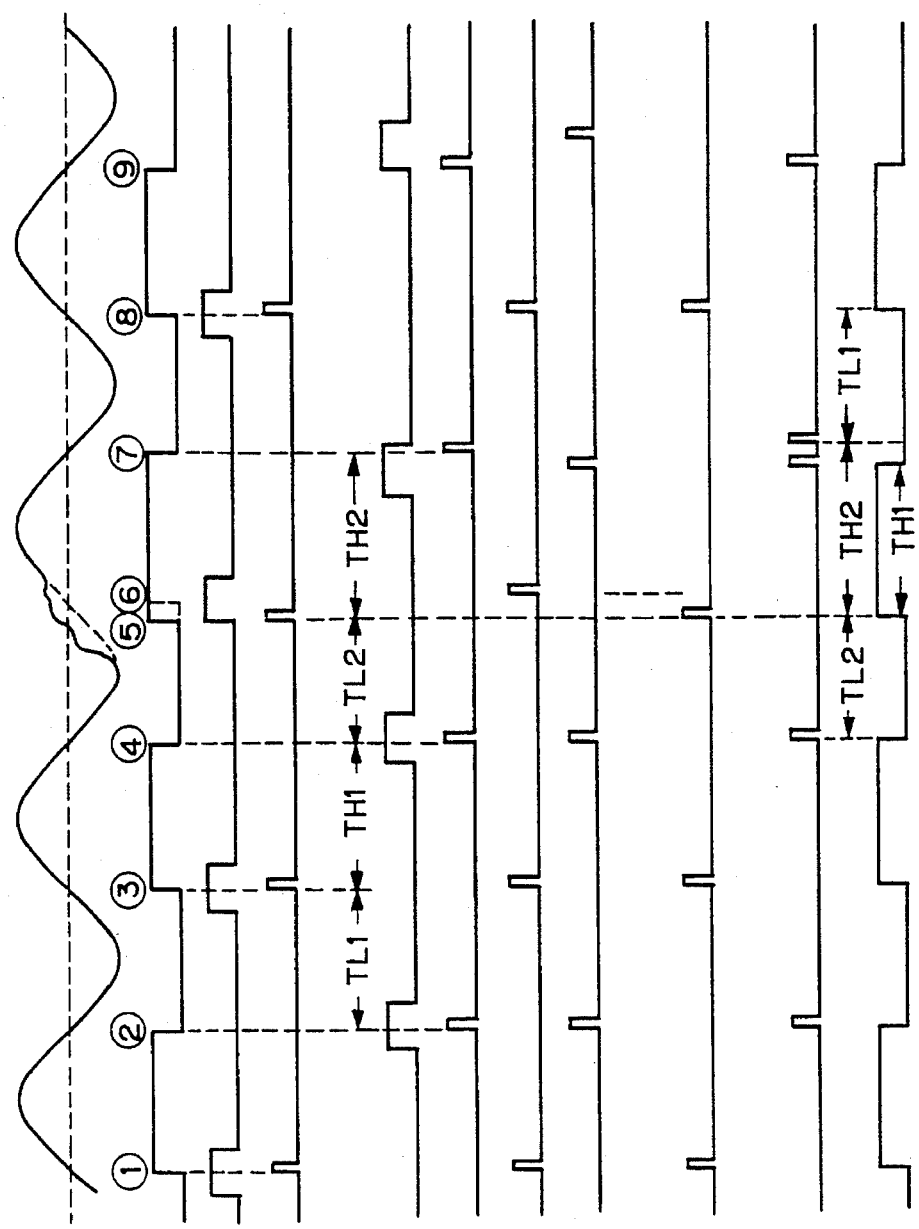

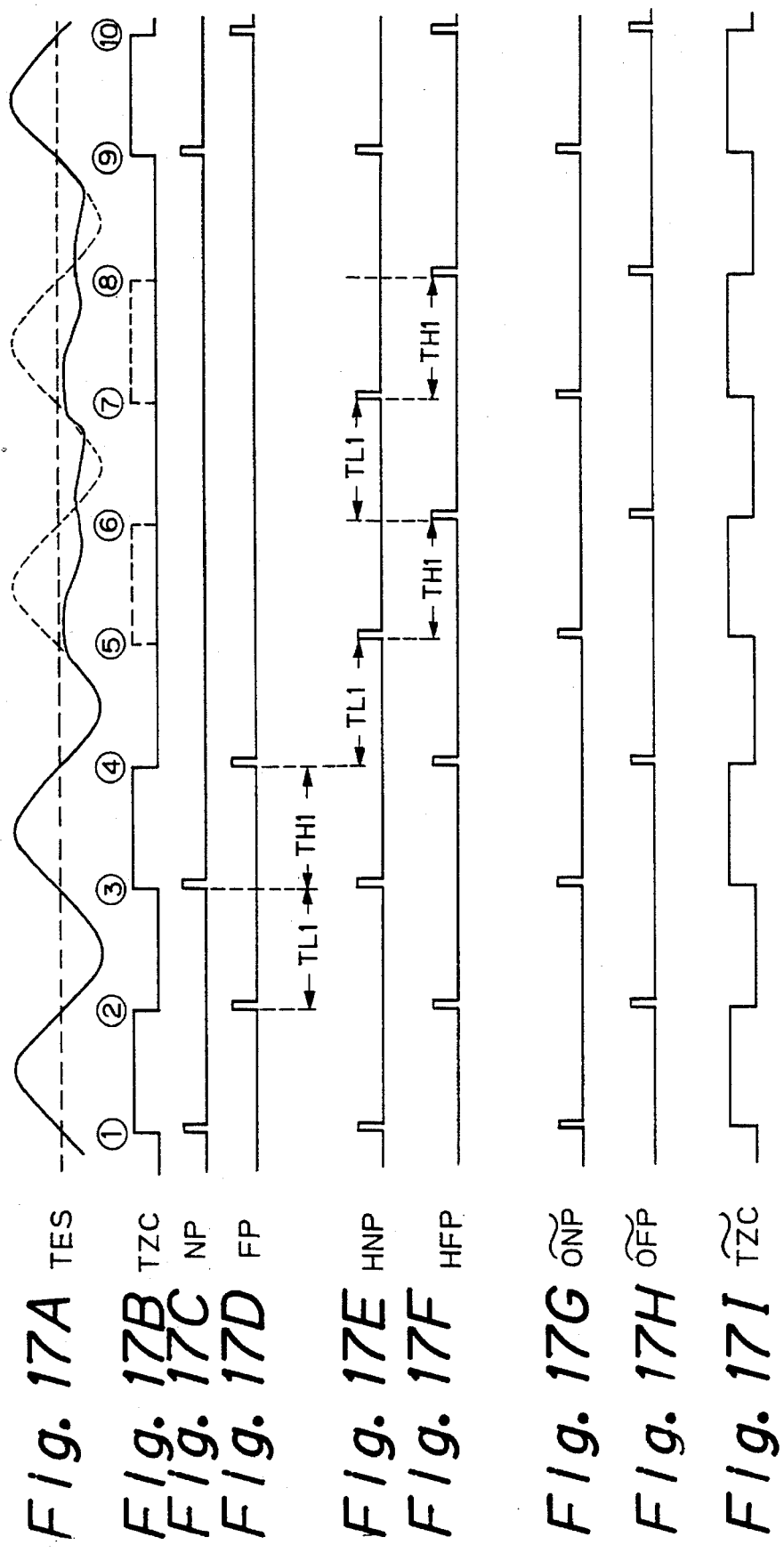

METHOD AND CIRCUIT FOR CORRECTING TRACK ZERO CROSSING SIGNAL IN OPTICAL TRACK

This is a continuation of application Ser. No. 07/851,473, filed on Mar. 13, 1992 now abandoned.

BACKGROUND OF THE INVENTION

1. Field of the Invention

The present invention relates to a method and circuit for correcting a track zero-crossing signal generated from a signal detected by an optical head, in an optical disk system for effecting seek control by a track crossing signal obtained by irradiating an optical beam from the optical head to an optical disk, in order to make the seek control more reliable.

In comparison with a magnetic disk system, an optical disk system and an opto-magnetic disk system have the advantage that memory capacity is greater, but their application is limited because access speed is low.

The major proportion of said access speed is occupied by the seek operation. If this seek can be carried out at high speed and moreover, accurately, the access speed can be improved and the range of the application of the optical disk system and opto-magnetic disk system can be expanded. Therefore, a high speed and accurate seek operation is required.

2. Description of the Related Art

In an optical disk system, an optical head for irradiating an optical beam to an optical disk and a motor (a voice coil motor) for driving the optical head in a radial direction of the optical disk are provided to the optical disk (opto-magnetic disk), which is rotated by a spindle motor.

In the optical disk, on the other hand, a track is disposed between guide grooves and the reflected beam of the optical beam, irradiated from the optical head, from the optical disk, provides a track error signal. A track servo control circuit obtains the track position error of the optical beam from a track error (tracking error) signal TES from the optical head, and controls the optical head so that the optical beam irradiates the track.

This track error signal TES is a sinusoidal wave for each track crossing period and the actual speed of the optical head can be measured from the period of this track error signal, and the number of crossed tracks can be known from the number of the track error signals TES.

A seek control unit acquires the actual speed of the optical head and the present track position from the track error signal TES, effects the seek control of a motor and positions the optical head to a desired track position.

In the optical disk, a mirror portion is disposed at the tail of an ID portion preformatted for each track (address information which is in advance recorded), and the guide grooves are interrupted at this mirror portion. In an optical disk system employing a system that detects tracking offset by this interrupted portion, the mirror portion is used for the detection of tracking offset. Incidentally, the optical disk system disclosed in this specification does not positively use said mirror portion.

Since said mirror portion is disposed, the track error signal TES is broken from the ID portion to its tail part when a seek is carried out at a relatively low speed of the track crossing period of 50 to 100 msec, and excessive pulses appear in a track zero-crossing signal TZC generated by slicing the track error signal TES by a zero level.

A frequency of the track error signal TES is about 500 KHz during the high speed seek. Therefore, the amplitude itself of the track error signal TES becomes small because of the frequency characteristics of an amplifier, and if the ID noise appears on the signal, track crossing cannot be detected by the zero-crossing signal TZC.

To correct this phenomenon, Japanese Unexamined Patent Publication (KOKAI) No. 2-137129, for example, discloses a method that corrects the track zero-crossing signal by providing a correction circuit that generates pseudo pulse signals.

This prior art method measures the period T of the track zero-crossing signal TZC, generates the pseudo pulse when an edge pulse of the track zero-crossing signal TZC does not appear within an interval 1.5 T and adds it to the edge pulse to thereby correct the track crossing pulse.

However, the conventional technique involves the following problems.

(i) Since the pseudo pulse is merely inserted, the excessive track zero-crossing signal TZC resulting from the breakage of the track error signal TES described above cannot be eliminated, and an error occurs in the number of crossed tracks and an accurate seek operation cannot be made.

(ii) Since the pseudo pulse is generated at the position of 1.5 times of the period T described above, the speed greatly deviates from actual speed and the speed control cannot be made correctly when the speed is obtained from the period of the track zero-crossing signal TZC.

(iii) The edge pulses of the track zero-crossing signals TZC within the 1.5 times of the previous period are all handled as correct pulses even though the waveform of the track zero signal TES is previously disturbed. Therefore, the detected speed deviates greatly from the actual speed when the speed is obtained from the period of the track zero-crossing signal TZC, and the speed control cannot be correctly made.

(iv) If the amplitude of the track error signal TES is small as described above, the pseudo pulse cannot be generated because the track zero-crossing signal TZC cannot be continuously obtained. Accordingly, an error occurs in the number of crossed track and an accurate seek operation cannot be made.

SUMMARY OF THE INVENTION

It is therefore an object of the present invention to provide a method and circuit that can prevent the occurrence of an error in the number of crossed tracks and detect accurately the actual speed.

According to the present invention, there is provided a method of correcting a raw track zero-crossing signal having a series of edges to produce a corrected track zero-crossing signal in an optical disk system comprising the steps of:

detecting the edges of the raw track zero-crossing signal;

successively generating expected edge timing and expected intervals at which edges of the track zero-crossing signal are expected based on past detected edges;

allowing detected edges to pass through as edges of the corrected track zero-crossing signal if these edges are detected within the expected intervals;

obstructing detected edges of those edges that are detected out of the expected intervals; and adding expected edges, before the respective expected intervals end, as the edges of the corrected track zero-crossing signal at the expected edge timing if edges are not detected within the expected intervals corresponding to the expected edge timing.

According to the present invention, there is also provided a circuit for correcting a raw track zero-crossing signal having a series of edges to produce a corrected track zero-crossing signal in an optical disk system, comprising:

detecting means for detecting the edges of the raw track zero-crossing signal;

control signal generating means for successively generating expected edge timing and expected intervals at which edges of the track zero-crossing signal are expected based on past detected edges; and sequence control means for allowing detected edges to pass through as edges of the corrected track zero-crossing signal if those edges are detected within the expected intervals, for obstructing detected edges of those edges that are detected out of the expected intervals, and for adding expected edges, before the respective expected intervals end, as the edges of the corrected track zero-crossing signal at the expected edge timing if edges are not detected within expected intervals corresponding to the expected edge timing.

According to the present invention, there is also provided a circuit for correcting a raw signal having a series of edges where a logic level of the signal alters to produce a corrected signal, comprising:

detecting means for detecting the edges of the raw signal;

control signal generating means for successively generating expected edge timing and expected intervals at which edges of a signal are expected, based on past detected edges; and sequence control means for allowing detected edges to pass through as edges of the corrected signal if those edges are detected within the expected intervals as obstructing detected edges of those edges are detected out of the expected intervals, and for adding expected edges, before the respective expected intervals end, as the edges of the corrected signal at the expected edge timing if edges are not detected within expected intervals corresponding to the expected edge timing.

BRIEF DESCRIPTION OF THE DRAWINGS

FIG. 14 is a circuit diagram of a track counter circuit in the embodiment of the present invention;

FIGS. 15A to 15K are waveform diagrams for explaining an operation of the embodiment of the present invention;

FIGS. 16A to 16K are waveform diagrams for explaining another operation of the embodiment of the present invention; and FIGS. 17A to 17I are waveform diagrams for explaining another operation of the embodiment of the present invention.

DESCRIPTION OF THE PREFERRED EMBODIMENTS

Optical Disk System

Figure 1:
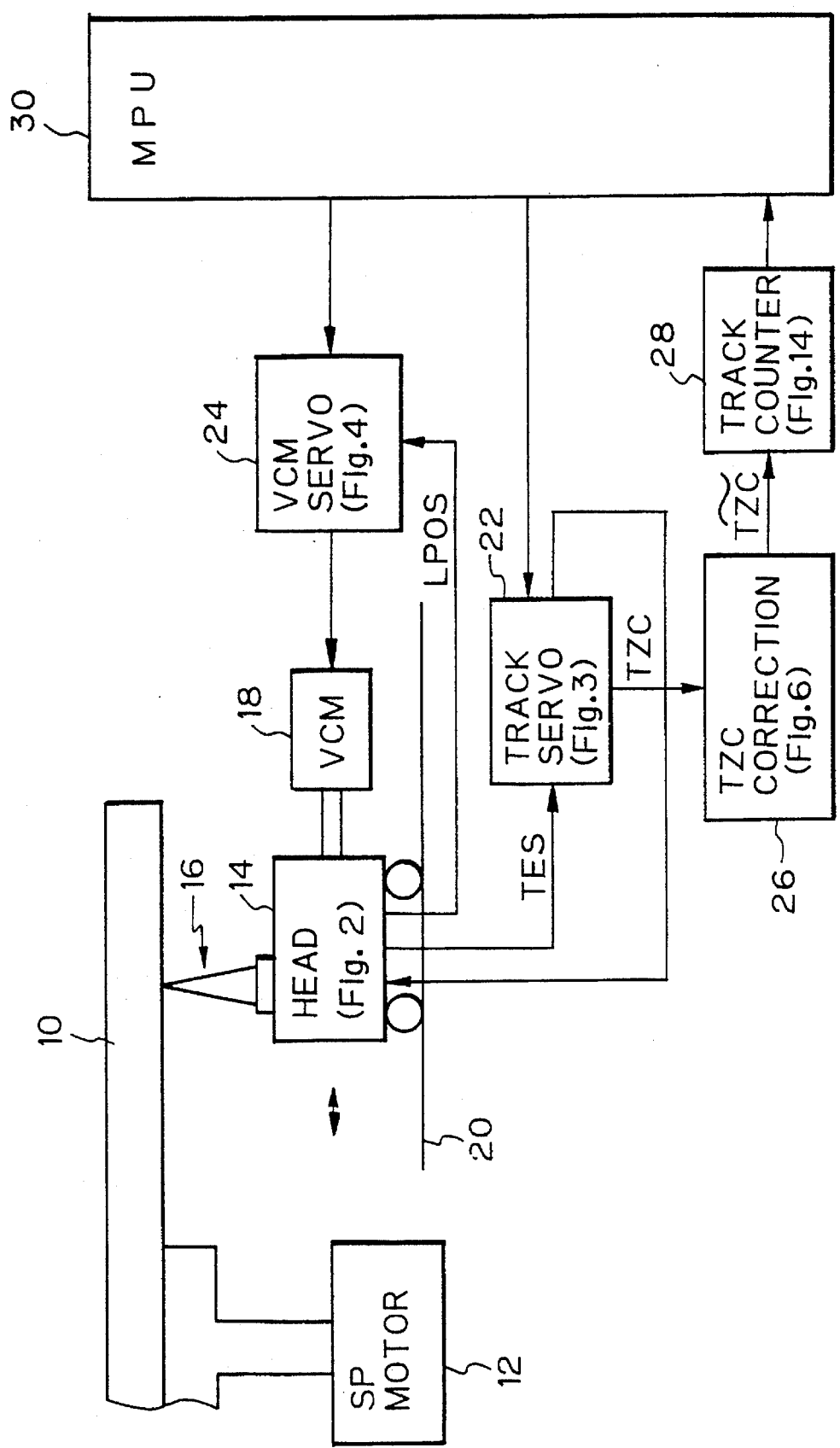
FIG. 1 is a block diagram of an embodiment of the present invention.

FIG. 1 is a block diagram of an embodiment of the present invention.

In FIG. 1, an optical disk 10 is rotated at a constant speed by a spindle motor 12, and is read/written by an optical beam 16 from an optical head 14.

The optical head 14 is moved for a seek by a voice coil motor 18 on a rail 20 in a radial direction of the optical disk 10, and a track servo control circuit 22 drives and controls an actuator for a later-appearing objective lens based on a track error signal TES from the optical head 14 and furthermore; a VCM servo circuit 24 drives and controls the voice coil motor 18. In this way, this system employs a double servo system for tracking and controlling the optical beam 16.

A TZC correction circuit 26 corrects a track zero-crossing signal TZC from the track servo control circuit 22 and outputs a corrected track zero-crossing signal $\overline{TZC}$. A track counter circuit 28 counts the number of crossed tracks and detects the actual speed, based on the corrected track zero-crossing signal $\overline{TZC}$.

A control unit 30 consists of a microprocessor, determines a target speed from the number of crossed tracks counted by the track counter circuit 28 and outputs an instruction current corresponding to the error in the actual speed measured by the track counter circuit 28 to a VCM servo circuit 24 (in the case of an ordinary seek) or to the servo control circuit 22 (in the case of a lens seek).

Figure 2:
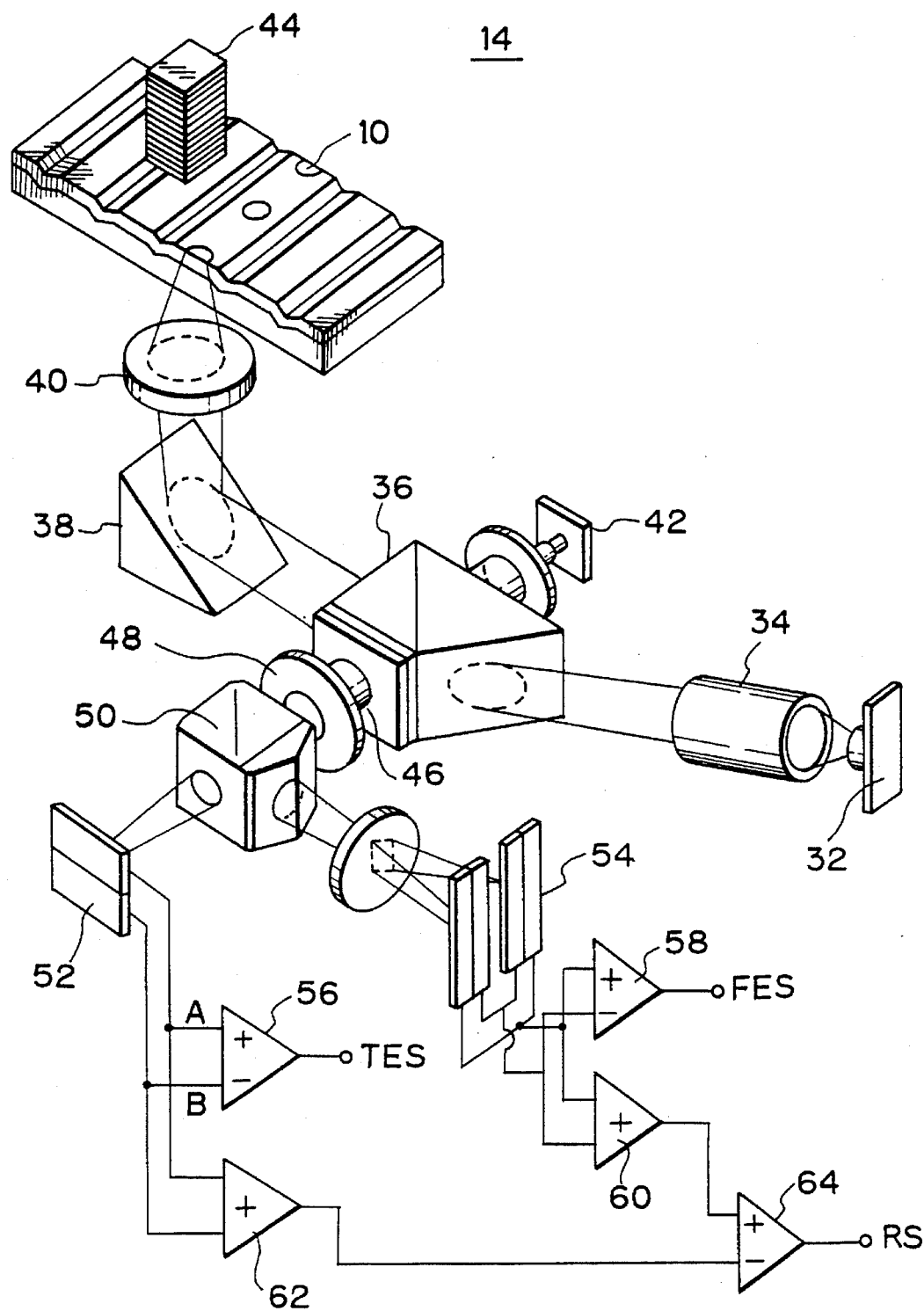
FIG. 2 is a structural view of an optical head according to the embodiment of the present invention.

FIG. 2 is a structural view of the optical head 14 shown in FIG. 1.

The outgoing beam of a semiconductor laser 32 is converted by a collimator lens 34, passes through a beam splitter prism 36, is reflected by a reflection mirror 38, is condensed by an objective lens (actuator) 40 and irradiates the surface of the optical disk 10. The reflected beam from the beam splitter prism 36 is incident into an optical sensor 42, and is utilized for stabilizing the output of the semiconductor laser 32.

At this time, a magnet 44 disposed so as to face the optical disk 10 provides magnetic force, and the optical disk 10 is read/written/erased as an opto-magnetic disk.

The reflected beam from the optical disk 10 is condensed by the objective lens 40, is reflected by the reflection mirror 38 and the beam splitter prism 36, is converted by a condenser lens 48 through a ½ wavelength plate 46, passes through a polarization beam splitter 50, irradiates a two-division photodetector 52 for tracking and is reflected to a four-division photodetector 54 for focusing.

The two-division photodetector 52 for tracking is divided into two segments so that it can detect the moving distance in the track direction on the surface of the optical disk 10, and the outputs A and B pass through an AGC circuit 66 (see FIG. 3), and a differential amplifier 56 calculates the difference and provides a track error signal TES.

The four-division photodetector 54 for focusing subtracts the output of two inner beam reception devices from the output of two outer beam reception devices by a differential amplifier 58 and provides a focus error signal FES.

Furthermore, an addition amplifier 60 adds the output of the two outer beam reception devices of the four-division photodetector 54 for focusing to the output of the two inner beam reception devices, and an addition amplifier 62 adds the outputs A and B of the two-division photodetector 52 for tracking. This sum is subtracted from the sum of the addition amplifier 60 by a differential amplifier 64 to provide a reproduction signal RS.

Figure 3:
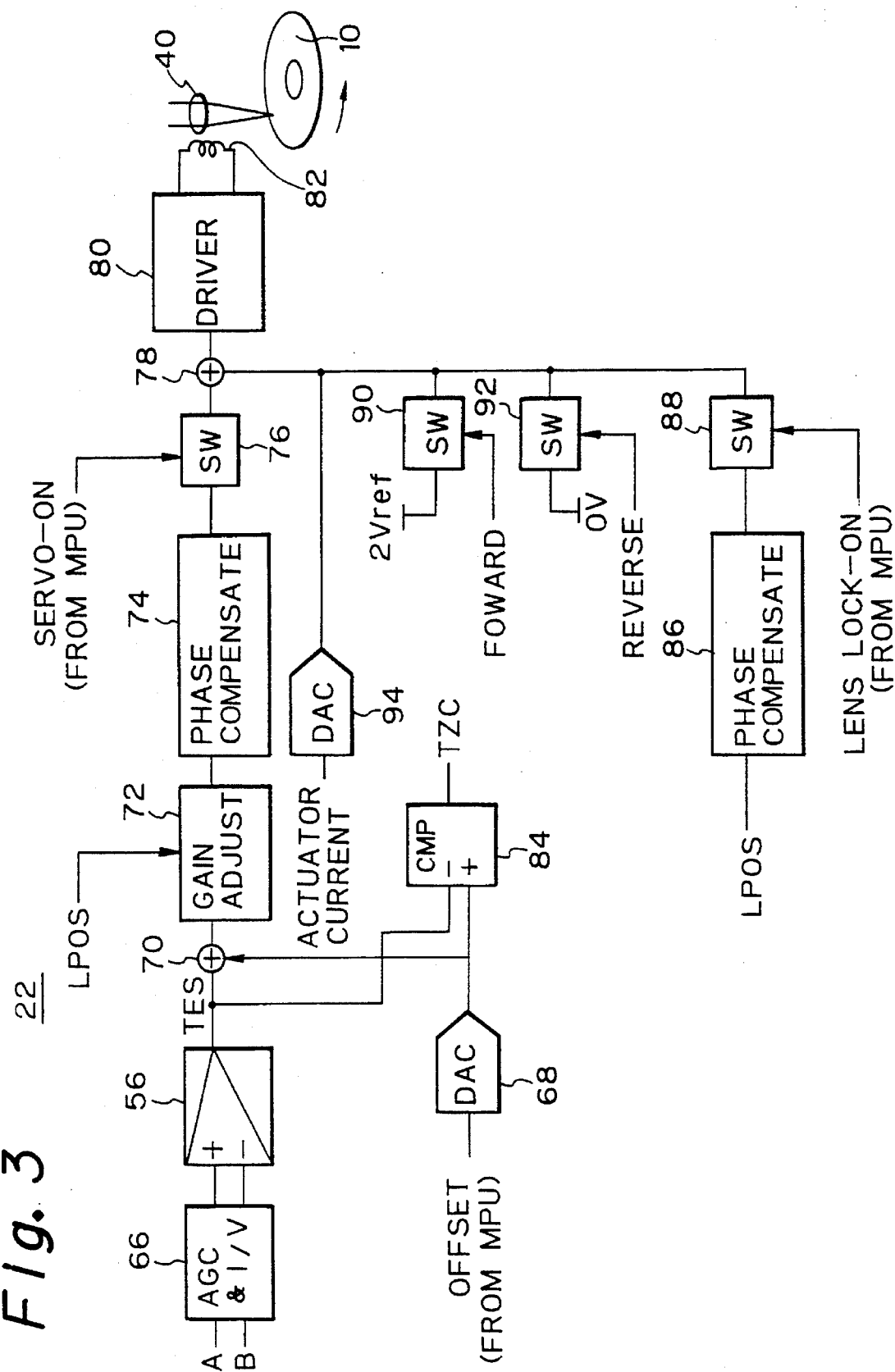
FIG. 3 is a block diagram of a track servo control circuit according to the embodiment of the present invention.

FIG. 3 is a block diagram of the track servo control circuit 22 shown in FIG. 1.

The outputs A and B of the two-division photodetector 52 for tracking are subjected to AGC (Automatic Gain control) by an AGC circuit 66 and are converted from current signals to voltage signals and their difference is calculated by the differential amplifier 56 to provide a raw track error signal TES. The reason AGC is applied is to correct the change of optical power of the semiconductor laser and correct a reflection factor of a medium.

The track offset from the MPU 30 is converted to an analog signal by a digital/analog convertor 68 and is added by an addition circuit 70 to the track error signal TES. The gain of this signal is adjusted by a gain control circuit 72 and its phase is advanced by a phase compensation circuit 74 to provide an actuator driving current.

When the track servo is ON, a switch 76 is kept ON and a driving current is supplied to a driving unit 80 through an addition circuit 78. Therefore, an actuator coil 82 is driven and effects the track servo control by driving the objective lens 40.

On the other hand, a comparator 84 slices the track error signal TES by the track offset from the digital/analog convertor 68, and generates a high level track zero-crossing signal TZC when the track error signal TES is above the track offset and a low level track zero-crossing signal TZC when the signal TES is below the track offset.

A phase compensation circuit 86 and a switch 88 are disposed in order to prevent a run-away of the actuator 82 during the ordinary seek operation (position seek). The switch 88 is turned ON from a lens lock-on signal from the MPU 30 and the actuator 82 is kept fixed at a neutral point by a lens position signal LPOS from the optical head 14.

Switches 90 and 92 are a circuit for effecting a kick control. Under the on-track state, this circuit jumps the optical beam by one track when the optical beam is about to move to the inner side. The switch 90 is turned ON by the control of the MPU 30 so as to apply a pulsed acceleration voltage in an outer direction to a driving unit 80, and the switch 92 is turned ON so as to apply a pulsed acceleration voltage in an inner direction to the driving unit 80. These switches 90 and 92 are used also for the purpose of deceleration at the time of stopping immediately before the arrival at a target track.

A digital/analog convertor 94 is a circuit for seeking the lens by controlling the objective lens actuator 82. In order to effect the lens seek in a relatively short distance (1 to 100 tracks), it converts the actuator current, which is by far slower than the position seek by the MPU 30, to an analog quantity and applies it to the driving unit 80. The MPU 30 controls the actuator current so as to reach the target track.

Figure 4:
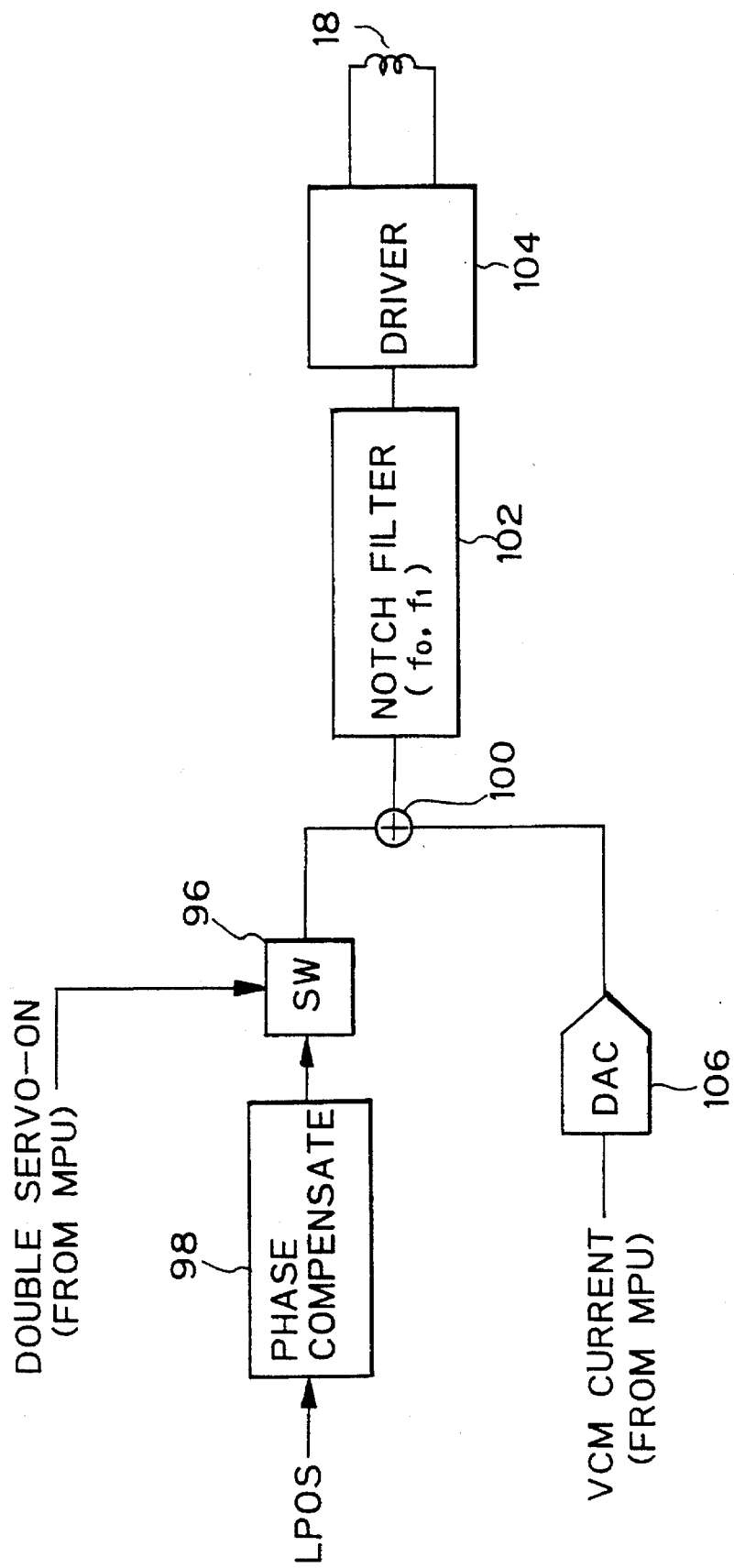
FIG. 4 is a block diagram of a VCM servo circuit according to the embodiment of the present invention.

FIG. 4 is a block diagram of the VCM servo circuit 24 shown in FIG. 1.

While the track servo is applied, a switch 96 is turned ON by a double servo-ON signal from the MPU 30. The phase of the lens position signal LPOS from the optical head 14 is advanced by a phase compensation circuit 98 and is converted to a speed signal, and mechanical resonance components f0, f1 are cut off by a notch filter 102 through an addition circuit 100. The signal is then applied to a driving unit 104 so as to drive the VCM.

The switch 96 is turned OFF at the time of the position seek, and a VCM current in the form of a digital signal is applied from the MPU 30 to a digital/analog convertor 106. After mechanical resonance components f0, f1 are cut off by the notch filter 102 through the addition circuit 100, the current is applied to the driving unit 104 to drive the VCM 18.

Figure 5:
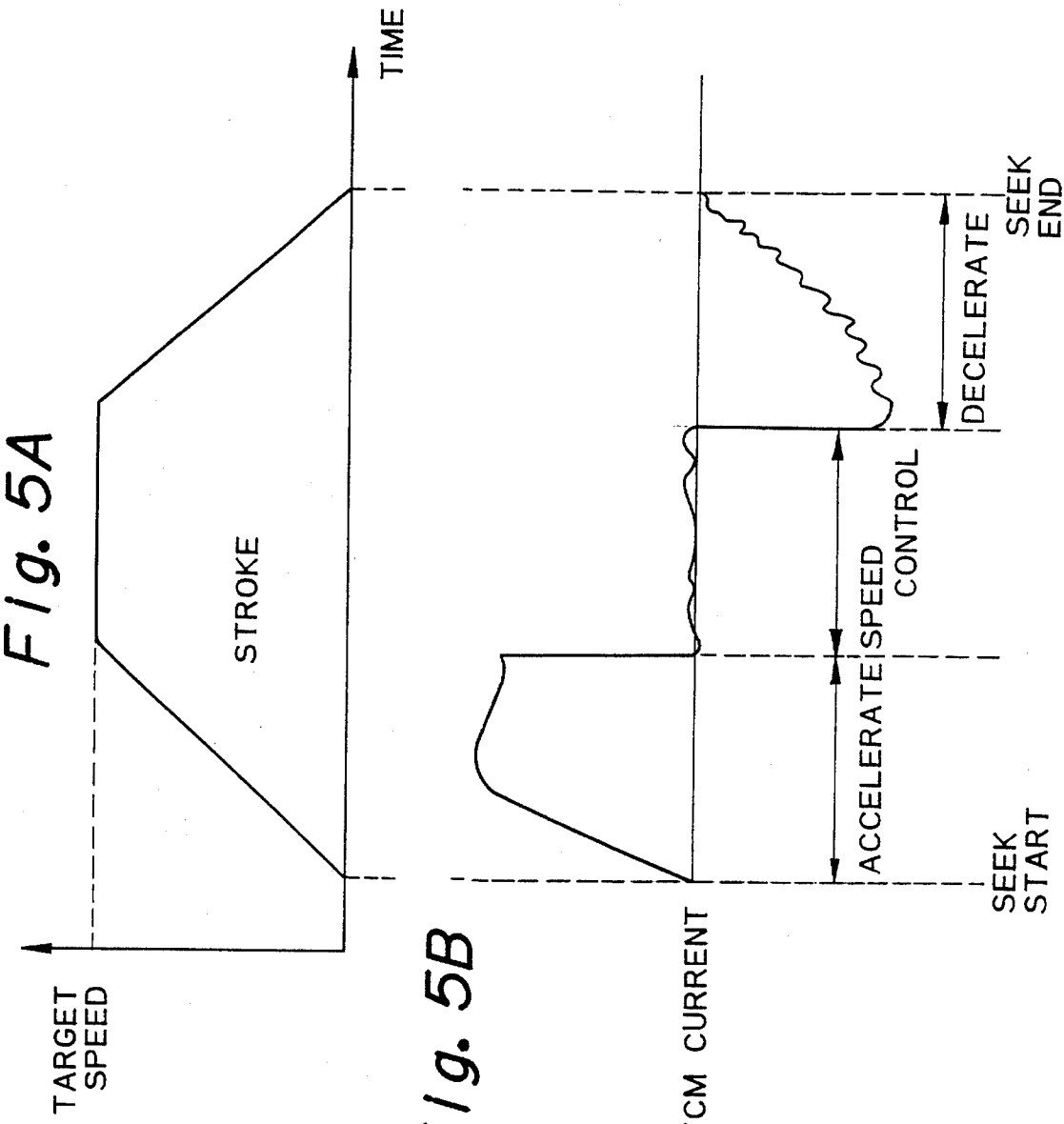
FIGS. 5A and 5B are waveform diagrams for explaining a seek operation in the embodiment of the present invention.

FIGS. 5A and 5B are waveform diagrams for explaining the seek operation.

When a seek instruction is given from a controller not shown in the drawings, the MPU 30 turns ON the track servo (by turning OFF the switch 76 of the track servo circuit and turning ON the switch 88), and moves the optical head 14 in a designated direction and by a designated difference.

There are two kinds of seek operations. One is the lens seek for controlling the objective lens actuator 40 and the other is the position seek for controlling the VCM 18.

The position seek is a high speed seek operation for driving and moving the VCM, and this operation positions the optical head 14 to a target track at high speed.

To accomplish this object, the MPU 30 sets a target speed from the seek direction and the difference as shown in FIG. 5A, determines a speed error, and applies a VCM current shown in FIG. 5B to a digital/analog convertor 106 of the VCM servo circuit 24 so that this speed error becomes zero.

The MPU 30 reads the number of crossed tracks and the present speed from the track counter circuit 28 (see FIG. 1), subtracts the number of crossed tracks from the target number of tracks for determining the number of remaining tracks, calculates a target speed and a feedforward quantity in accordance with the number of remaining tracks, calculates the speed error from (target speed−present speed+ feedforward quantity), and supplies the VCM current to the digital/analog convertor 106 of the VCM servo circuit 24 so that the speed error becomes zero.

This feedforward quantity is the information necessary for decelerating the optical head 14 when the head reaches the target speed and comes close to the target track, and is in advance stored in the memory of the MPU 30.

The lens seek is employed for the seek operation, which moves in a relatively short distance (1 to 100 tracks). The actuator current at a speed far slower than that of the position seek of the MPU 30 is output to the digital/analog convertor 94, is converted to the analog quantity, and is applied to the driving unit 80 so as to drive the objective lens actuator 82. The MPU 30 similarly controls the actuator current so as to reach the target track.

Seek Control Circuit

Figure 6:
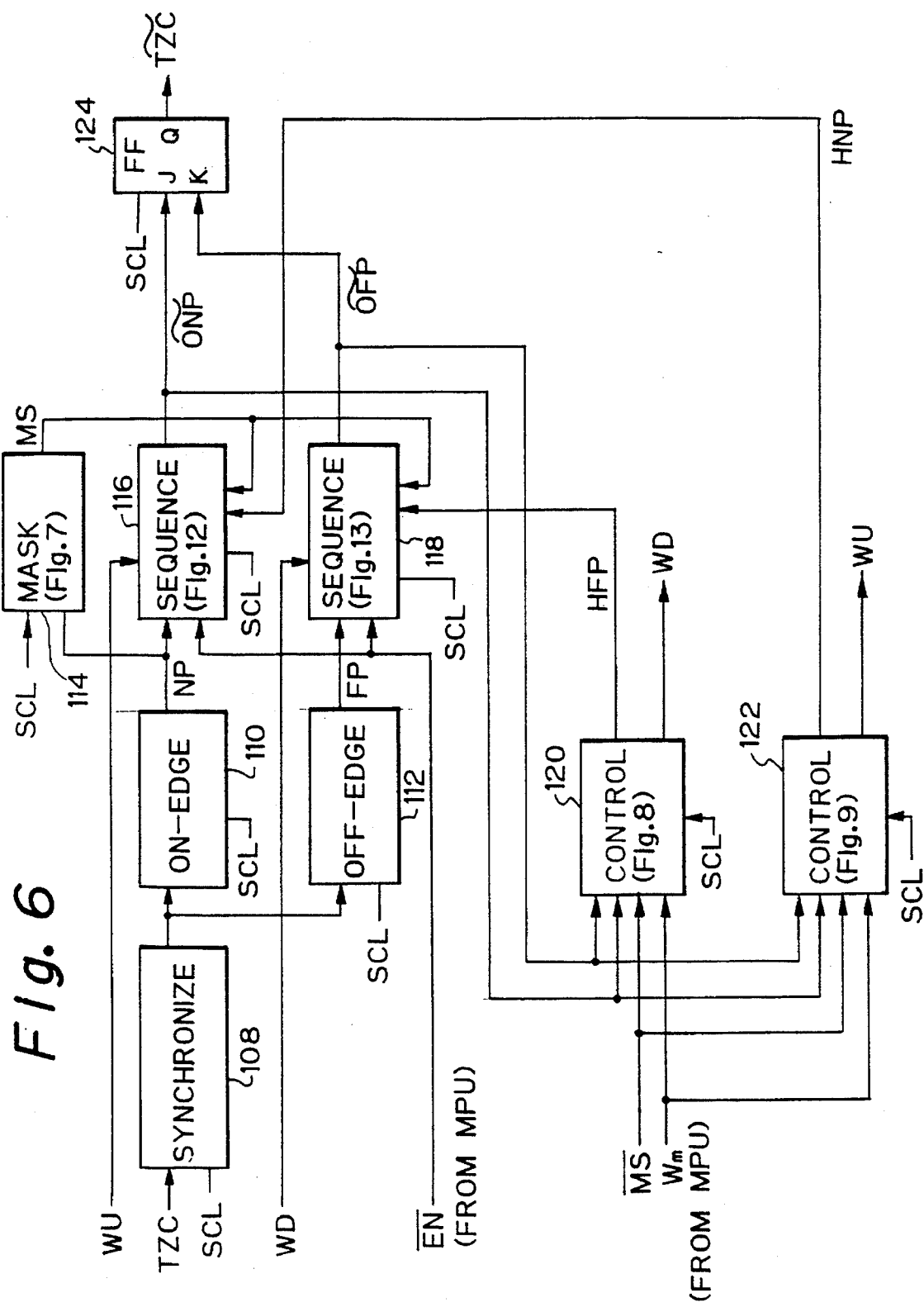
FIG. 6 is a block diagram of a TZC correction circuit in the embodiment of the present invention.

FIG. 6 is a block diagram of the TZC correction circuit shown in FIG. 1.

In the drawing, a synchronization circuit 108 synchronizes the track zero-crossing signal TZC from the track servo control circuit 22 with a system clock SCL (about 10 MHz) having a sufficiently higher frequency than the track crossing period. An on-edge generation circuit 110 generates an on-edge pulse NP at the rise of the synchronized track zero-crossing signal TZC. An off-edge generation circuit 112 generates an off-edge pulse FP at the fall of the synchronized track zero-crossing signal TZC.

Figure 7:
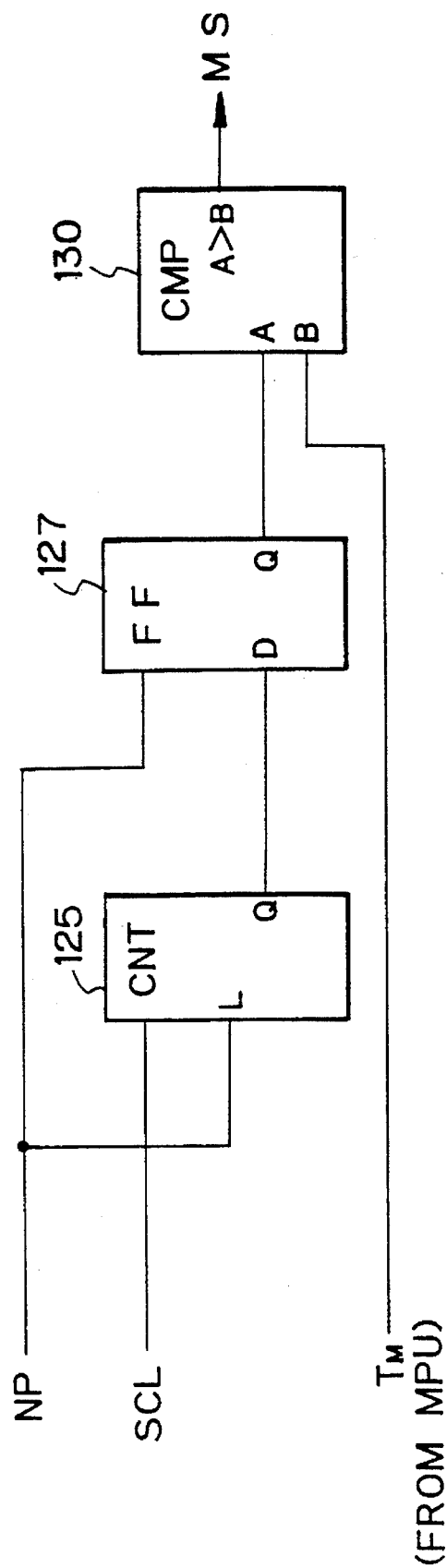
FIG. 7 is a circuit diagram of a mask signal generation circuit in the embodiment of the present invention.

A mask signal generation circuit 114 detects the period of the track zero-crossing signal TZC from the one-edge pulse NP, as will be described later with reference to FIG. 7, compares it with the maximum period set by the MPU 30, generates a mask signal MS when the detected period is greater than the maximum period and inhibits the operation of later-appearing sequence circuits 116 and 118.

As will be explained later with reference to FIG. 12, the sequence circuit 116 outputs only the on-edge pulse NP within the period of a rise window signal WU from a later-appearing control signal generation circuit 122 as a corrected on-edge pulse ONP when the mask signal MS is not generated, and outputs an expected on-edge pulse HNP from the control signal generation circuit 122 as a corrected on-edge pulse ONP when the on-edge pulse NP does not exist within the period of the rise window signal WU.

As will be explained later with reference to FIG. 13, the sequence circuit 118 outputs only the off-edge pulse FP within the period of the fall window signal WD from a later-appearing control signal generation circuit 120 as a corrected off-edge pulse OFP when the mask signal MS is not generated, and outputs an expected off-edge pulse HFP from the control signal generation circuit 120 as a corrected off-edge pulse OFP when the off-edge pulse FP does not exist within the period of the fall window signal WD.

As will be explained later with reference to FIG. 8, the control signal generation circuit 120 measures the interval between the normal on-edge pulse ONP output by the sequence circuit 116 and the normal off-edge pulse OFP output by the sequence circuit 118, generates the fall window signal WD with a position expected from the interval being the center, and generates an expected off-edge pulse HFP at the expected position.

As will be explained later with reference to FIG. 9, the control signal generation circuit 122 measures the interval between the normal off-edge pulse OFP output by the sequence circuit 118 and the normal on-edge pulse ONP output by the sequence circuit 116, generates the rise window signal WU with a position expected from the interval being the center, and generates an expected one-edge pulse HNP at the expected position.

A flip-flop 124 for generating the track zero-crossing signal is set by the corrected on-edge pulse $\overline{ONP}$ from the sequence circuit 116, is reset by the corrected off-edge pulse $\overline{OFP}$ from the sequence circuit 118, and generates a corrected track zero-crossing signal $\overline{TZC}$.

FIG. 7 is a circuit diagram of the mask signal generation circuit 114 shown in FIG. 6.

A one-period counter 125 is reset by a detected on-edge pulse NP from the on-edge generation circuit 110, starts counting, counts the number of system clocks SCL and counts the interval of the detected on-edge pulses NP (the period of the track zero-crossing signal TZC). A one-period retention flip-flop 127 holds the count value of the counter 125 by the detected on-edge pulse NP from the on-edge generation circuit 110. A comparison circuit 130 compares the time A of one period held by the flip-flop 127 with the maximum value B of one period from the MPU 30, and generates a high level mask signal MS when A>B.

Therefore, when at a low speed and the period A of the track zero-crossing signal TZC exceeds the set maximum value B, it generates the high level mask signal MS and nullifies the operation of the sequence circuits 116 and 118.

The TZC correction circuit 26 of the present invention corrects the zero-crossing signal TZC by limiting the change of the period of the zero-crossing signal TZC generated at irregular intervals within a predetermined range. When the seek speed is below a predetermined value, or in other words, when the pulse interval of the zero-crossing signal TZC is above a predetermined value, the value of the pulse interval as an inverse number of the speed is great. Accordingly, the change quantity of the value of the pulse interval is also great even in the normal zero-crossing signal. When the correction described above is effected, an undesirable result will occur. In such a case, the mask signal MS is generated in the afore-mentioned mask signal generation circuit 114 (see FIG. 7) and is applied to the sequence circuits 116, 118 so as to mask their operations and thus not effect the correction of the zero-crossing signal.

Incidentally, the correction of the zero-crossing signal is not made because of the mask signal during the low speed seek operation. However, elimination of the noise components can easily be accomplished within the range where the frequency of the zero-crossing signal is low, by constituting the comparator 84 (FIG. 3) so as to have a suitable hysteresis.

Figure 8:
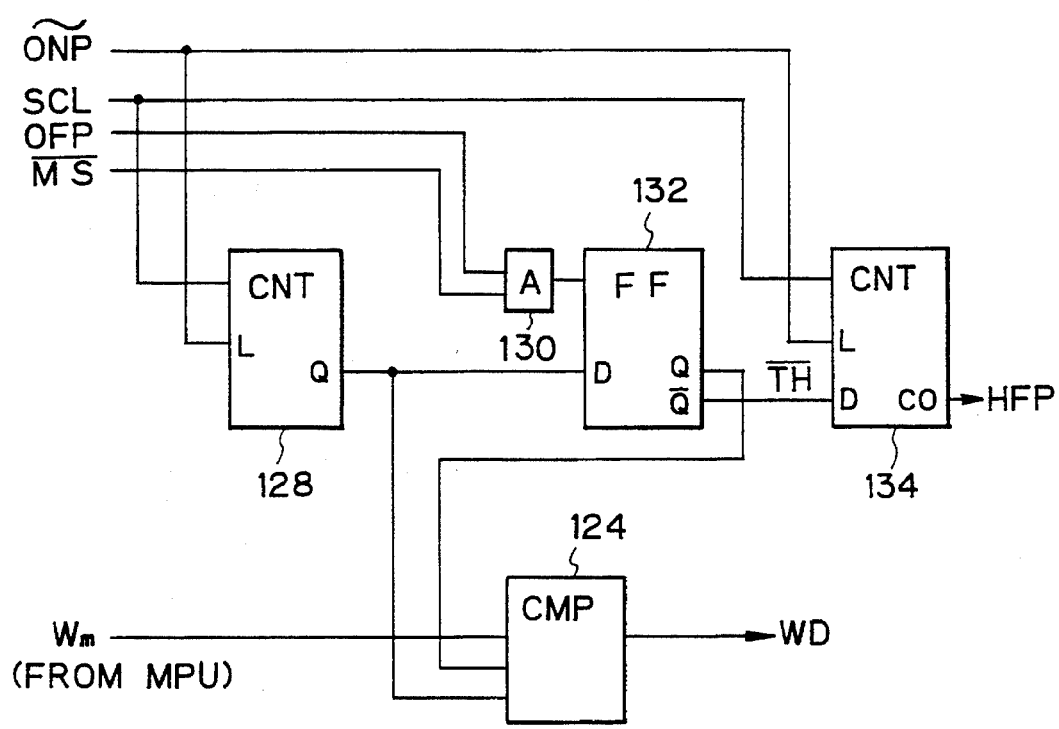
FIG. 8 and 9 are circuit diagrams of control signal generation circuits in the embodiment of the present invention.
Figure 9:
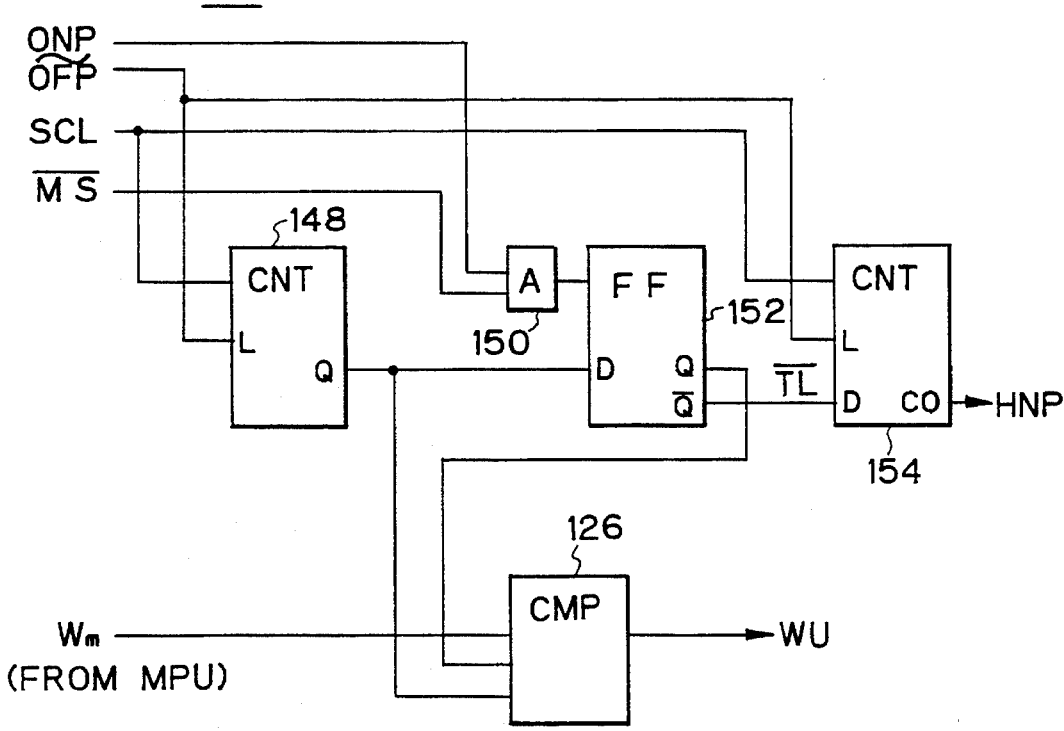
Figure 10:
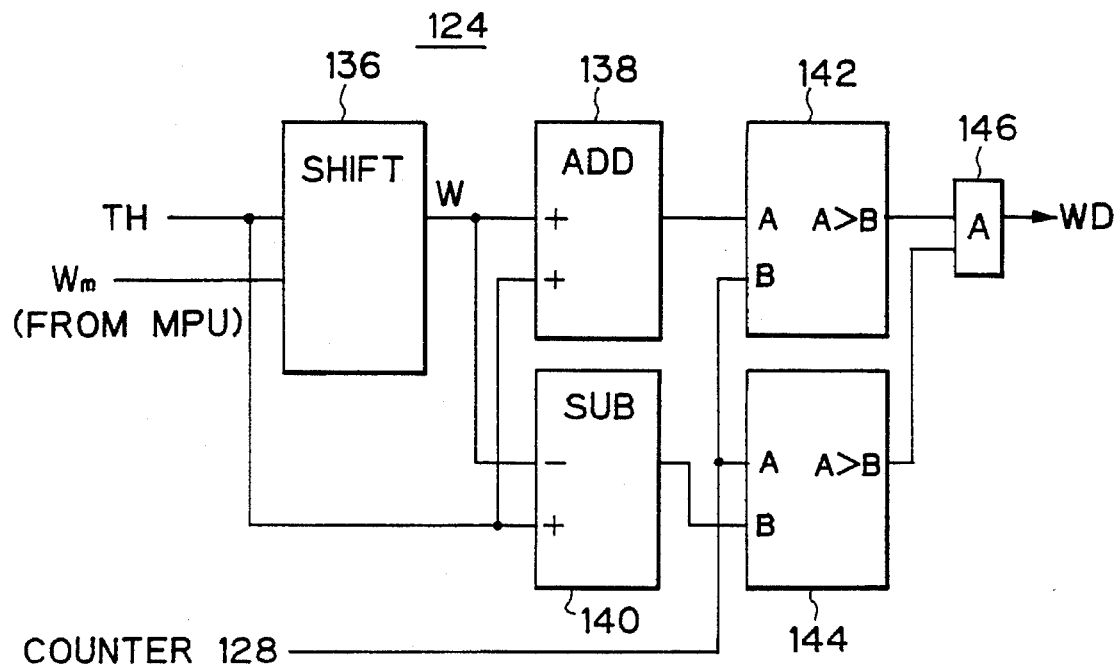
FIGS. 10 and 11 are circuit diagrams of window generation circuits in the embodiment of the present invention.
Figure 11:
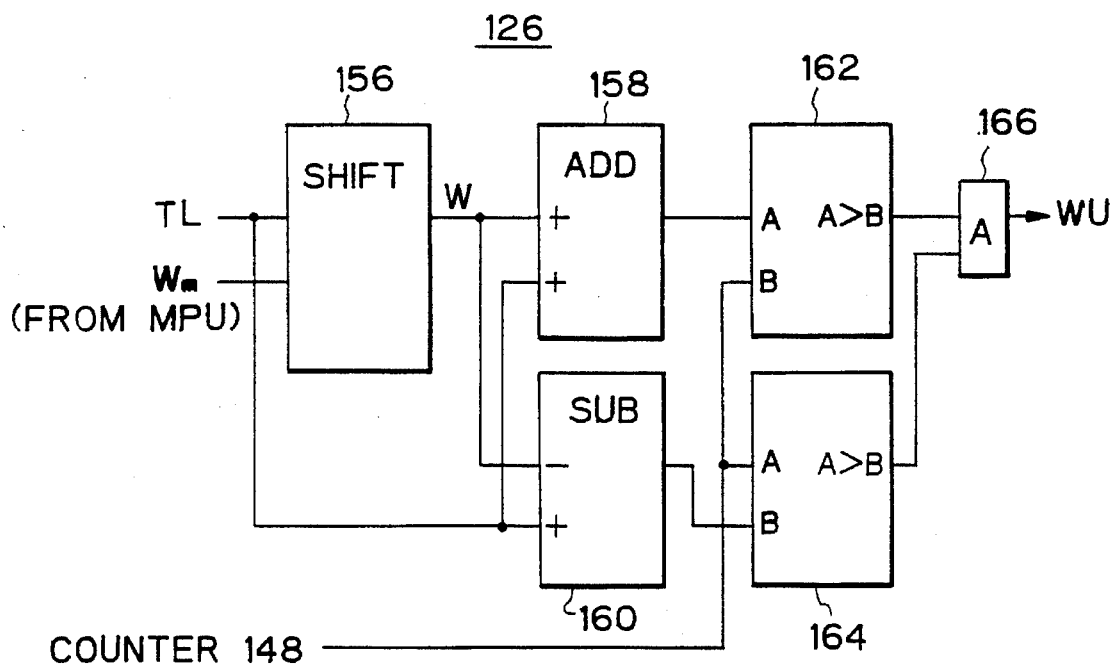

FIGS. 8 and 9 are circuit diagrams of the control signal generation circuits 120 and 122 shown in FIG. 6, respectively. FIGS. 10 and 11 are circuit diagrams of the window generation circuits 124 and 126 shown in FIGS. 8 and 9, respectively.

In the control signal generation circuit 120 shown in FIG. 8, a High time counter 128 is reset by the corrected on-edge pulse ONP from the sequence circuit 116, starts counting and counts the system clocks SCL. An AND gate 130 passes the normal off-edge pulse OFP from the sequence circuit 118 when the mask signal MS from the mask signal generation circuit 114 is at a low level. A High time holding flip-flop 132 holds the count value of the counter 128 by the off-edge pulse OFP from the AND gate 130.

In an expected off-edge generation timer 134, the held value of the flip-flop 132 (the interval from the on-edge pulse ONP to the off-edge pulse OFP, i.e. the High time of the track zero-crossing signal TZC) TH is loaded by the corrected on-edge pulse $\overline{ONP}$ the system clocks SCL are counted down, and an expected off-edge pulse HFP is generated after the passage of the High time (expected time) of the track zero-crossing signal TZC.

As will be explained with reference to FIG. 10, the window generation circuit 124 compares the last High time TH held by the flip-flop 132 with the count value of the counter 128 and when the High time and the count value coincide with each other (expected timing), generates a fall window signal WD of a predetermined width with this timing as the center.

As will be explained later in further detail, the corrected on-edge pulses $\overline{ONP}$ are the OR of the normal on-edge pulses ONP and the expected on-edge pulses HNP. The normal on-edge pulses ONP are those pulses among the detected on-edge pulses NP, that exist within the rise window WU. Similarly, the corrected off-edge pulse $\overline{SOFP}$ are the OR of the normal off-edge pulses OFP and the expected off-edge pulses HFP. The normal off-edge pulses OFP are those pulses among the detected off-edge pulses FP, that exist within the fall window WD. As shown in FIG. 8, the corrected on-edge pulse $\overline{ONP}$ is used for resetting the counters 128 and 134 but the normal off-edge pulse OFP is used for holding the High time in the flip-flop 132. As will be described later in detail, when the normal pulse ONP or OFP is output at a timing later than the expected pulse HNP or HFP, the two pulses are continuously output as the corrected pulse ONP or OFP. Therefore, the High time is held at the timing of the normal pulses ONP, OFP so as to obtain the newest High time. In this case, even when the counters 128 and 134 are reset by the expected on-edge pulse HNP, they are again reset by the normal on-edge pulse ONP succeeding immediately thereafter, so that the interval between the normal on-edge pulse ONP and the normal off-edge pulse OFP is held as the High time.

In the window generation circuit 124 shown in FIG. 10, a shift circuit 136 consisting of a large number of multiplexers shifts the High time TH held by the flip-flop 132 to the right by the number of bits designated by a window margin Wm set from the MPU 30, and generates a window width W.

An adder 138 adds the High time TH to the window width W, and a subtracter 140 subtracts the window width W from the high time TH. A comparator 142 compares the output A (=TH+W) of the adder 138 with the count value B of the counter 128 and generates a high level output when A>B.

A comparator 144 compares the count value A of the counter 128 with the output B (=TH−W) of the subtracter 140 and generates a high level output when A>B.

An AND gate 146 calculates AND (logical product) between the outputs of these comparators 142 and 144 and generates a fall window signal WD having a width ±W with the timing after the High time TH as the center.

In the control signal generation circuit 122 shown in FIG. 9, a low time counter 148 is reset by the corrected off-edge pulse $\overline{OFP}$ from the sequence circuit 118, and counts the system clocks SCL. An AND gate 150 allows the passage of the normal on-edge pulse ONP from the sequence circuit 116 when the mask signal MS from the mask signal generation circuit 114 is at a low level. A low time holding flip-flop 152 holds the count value of the counter 148 by the on-edge pulse ONP from the AND gate 150.

In the expected on-edge generation timer 154, the held value of the flip-flop 152 (the interval from the off-edge pulse OFP to the on-edge pulse ONP, that is, the low time of the track zero-crossing signal $\overline{TZC}$) TL is loaded by the corrected off-edge pulse $\overline{OFP}$, the system clocks SCL are counted down, and an expected on-edge pulse HNP is generated after the passage of the low time TL (expected time) of the track zero-crossing signal TZC.

As will be explained with reference to FIG. 11, the window generation circuit 126 compares the last low time TL retained in the flip-flop 152 with the count value of the counter 148, and generates a rise window signal WU of a predetermined width with the point of time (expected time), at which the low time TL coincides with the count value, as the center.

For the same reason as has been explained with reference to the control signal generation circuit 120, the counters 148 and 154 are reset by the timing of the corrected off-edge pulse $\overline{OFP}$, and the low time TL is held by the flip-flop 152 at the timing of the normal on-edge pulse ONP.

In the window generation circuit 126 shown in FIG. 11, a shift circuit 156 consisting of a large number of multiplexers shifts the low time TL held by the flip-flop to the right by the number of bits designated by the window margin Wm and generates the window width W.

An adder 158 adds the low time TL to the window width W and a subtracter 160 subtracts the window width W from the low time TL.

A comparator 162 compares the output A (=TL+W) of the adder 158 with the count value B of the counter 148 and generates a high level output when A>B.

A comparator 164 compares the count value A of the counter 148 with the output B (=TL−W) of the subtracter 160 and generates a high level output when A>B.

An AND gate 166 generates a rise window signal WU of a width ±W with the timing at which the low time TL has passed, with the center by calculating the AND (logical product) between the outputs of the comparators 162 and 164.

Figure 12:
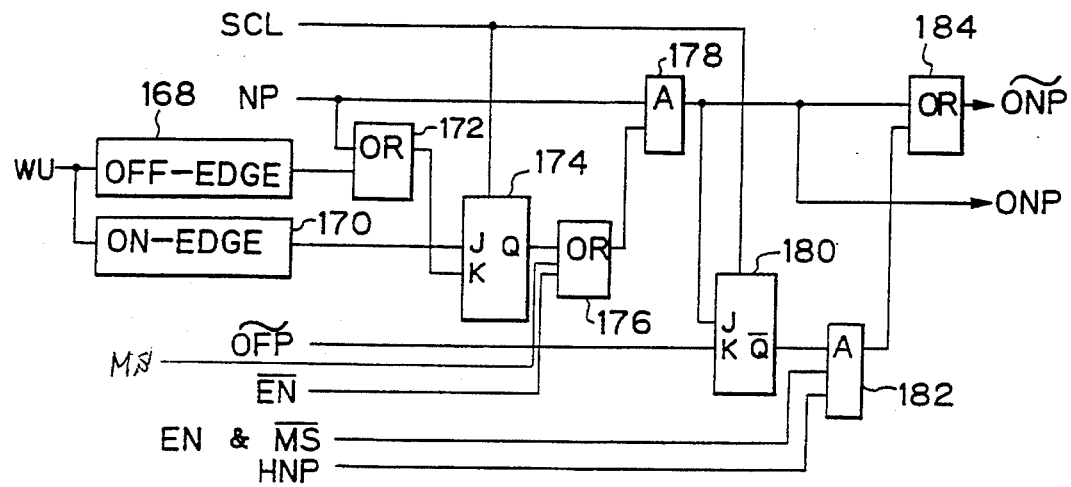
FIGS. 12 and 13 are circuit diagrams of sequence circuits in the embodiment of the present invention.
Figure 13:
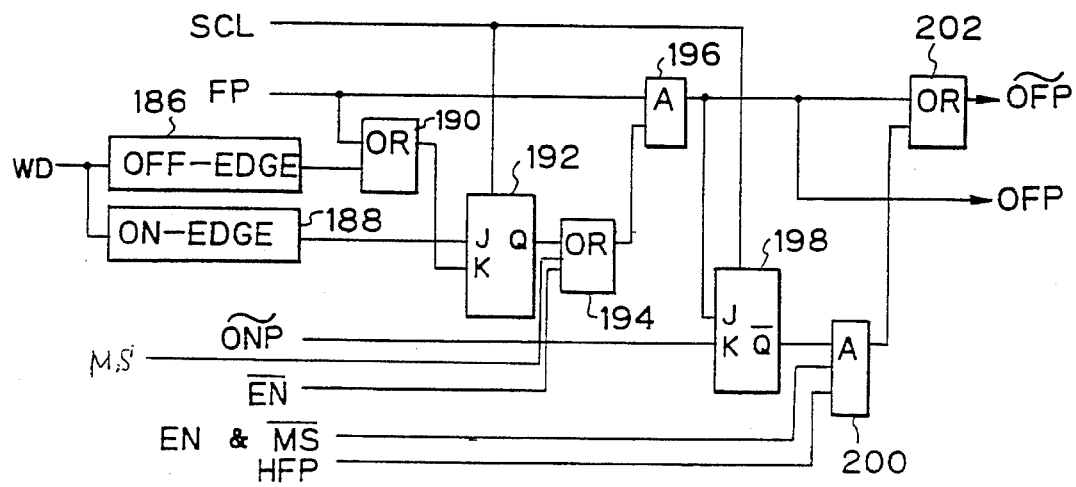

FIGS. 12 and 13 are circuit diagrams of the sequence circuits 116 and 118 shown in FIG. 6, respectively.

In FIG. 12, the rise window WU is input to the off-edge pulse generation circuit 168 and to the on-edge pulse generation circuit 170 and the off-edge pulse and on-edge pulse of the rise window WU are generated, respectively.

An OR gate 172 calculates the OR (logical sum) between the on-edge pulse NP from the on-edge generation circuit 110 (see FIG. 6) and the off-edge pulse of the rise window WU from the off-edge generation circuit 168.

A flip-flop 174 set by the on-edge pulse of the rise window WU from the on-edge generation circuit 170 is reset by the output of the OR gate 172 and generates a gate signal.

An OR gate 176 calculates the OR (logical sum) between the gate signal from the flip-flop 174 and the inverted enable signal $\overline{EN}$ from the MPU 30.

The inverted enable signal $\overline{EN}$ from the MPU 30 is supplied in order to nullify operations of this circuit 116 during the period in which the period of the track zero-crossing signal TZC has not been stabilized sufficiently such as at the initial seek stage, and to initialize the circuit during the passage of two to three tracks until the period of the track zero-crossing signal TZC becomes stabilized.

An AND gate 178 allows the passage of only those pulses among the on-edge pulses NP from the on-edge generation circuit 110 (FIG. 6) that exist during the period of the window signal from the OR gate 176 as the normal on-edge pulses ONP. A flip-flop 180 set by the output from the AND gate 178 is reset by the corrected off-edge pulse $\overline{OFP}$ output from the sequence circuit 118 and generates a gate signal for the expected pulse.

An AND gate 182 is opened by the $\overline{Q}$ output of the flip-flop 180 and by the AND signal between the enable signal EN and the inverted mask signal $\overline{MS}$, and allows the passage of the expected on-edge pulse HNP from the control signal generation circuit 122. An OR gate 184 calculates the OR between the normal on-edge pulse ONP passing through the AND gate 178 and the expected on-edge pulse HNP from the AND gate 182, and outputs the corrected on-edge pulse $\overline{ONP}$.

Accordingly, when the detected on-edge pulse NP appears in a period other than the period of the rise window WU, the pulse is cut off by the AND gate 178, and when the detected on-edge pulse NP appears within the period of the rise window WU, the expected on-edge pulse HNP is cut off by the AND gate 182 by the low level output of $\bar{Q}$. If the detected on-edge pulse NP does not appear during the period of the rise window WU, the expected on-edge pulse HNP is output by the AND gate 182 by the high level output of $\bar{Q}$.

In FIG. 13, the fall window WD is input to the off-edge generation circuit 186 and to the on-edge generation circuit 188, and the on-edge pulse of the fall window and the off-edge pulse of the fall window are generated, respectively.

An OR gate 190 calculates the OR (logical sum) between the off-edge pulse FP from the off-edge generation circuit 112 (FIG. 6) and the off-edge pulse of the fall window WD from the off-edge generation circuit 186.

A flip-flop 192 set by the on-edge pulse of the fall window WD is reset by the output of the OR gate 190 and generates a gate signal.

An OR gate 194 calculates the OR (logical sum) between the gate signal from the flip-flop 192 and the inverted enable signal $\overline{EN}$ from the MPU 30.

An AND gate 196 allows the passage of only those pulses among the off-edge pulses FP from the off-edge generation circuit 112 that exist during the period of the window signal from the OR gate 194 as the normal off-edge pulses OFP.

A flip-flop 198 set by the output of the AND gate 196 is reset by the corrected on-edge pulse $\overline{ONP}$ output by the sequence circuit 116 and generates the gate signal for the expected pulses. An AND gate 200 is opened by the $\bar{Q}$ output of the flip-flop 198 and by the AND signal between the enable signal EN and the inverted mask signal $\overline{MS}$ and allows the passage of the expected off-edge pulse HFP from the control signal generation circuit 120. An OR circuit 202 calculates the OR between the normal off-edge pulse OFP passing through the AND gate 196 and the expected off-edge pulse HFP passing through the AND gate 200, and outputs the corrected off-edge pulse $\overline{OFP}$.

Accordingly, when the detected off-edge pulse FP appears during the period other than the period of the fall window WD, it is cut by the AND gate 196, and when the detected off-edge pulse FP appears within the period of the fall window WD, the expected off-edge pulse HFP is cut by the AND gate 200 because of the low level output of $\bar{Q}$ and when the detected off-edge pulse FP does not appear during the period of the fall window WU, the AND gate 200 outputs the expected off-edge pulse HFP because of the high level output of $\bar{Q}$.

In FIG. 12 or FIG. 13, if the normal on-edge pulse ONP or the normal off-edge pulse 9FP appears earlier than the expected on-edge pulse HNP or the expected off-edge pulse HFP, the expected on-edge pulse HNP or the expected off-edge pulse HFP is checked by the gate 182 or the gate 200. However, if the expected on-edge pulse HNP or the expected off-edge pulse HFP appears earlier, they are not checked. Accordingly, the two pulses continuously appear at the output of the OR gate 184 or the OR gate 202. Even if such a case occurs, the counters 128, 134, 148, 154 in the control signal generation circuit shown in FIG. 8 or 9 are again reset by the later pulse, and a retention operation is effected at the timing of the normal on-edge pulse ONP or the normal off-edge pulse OFP. For this reason, the windows WD, WU and the expected pulses HFP, HNP are always generated from the newest data.

FIG. 14 is a block diagram of the track counter circuit 28 shown in FIG. 1. In FIG. 14, a zero-crossing pulse generation circuit 204 generates a zero-crossing pulse that is in synchronism with the clock at the rise or fall timing of the track zero-crossing signal $\overline{TZC}$ depending on whether a polarity signal POL indicating the inner or outer direction is at the H level or at the L level. A latch pulse generation circuit 206 generates a latch pulse in accordance with the latch signal from the MPU 30. A frequency division circuit 208 changes a frequency division ratio of the system clock in accordance with the frequency switch instruction from the MPU 30, and generates an operation clock. A load pulse generation circuit 210 generates a load pulse in accordance with the instruction from the MPU 30.

An interval counter 212 measures the interval of the zero-crossing pulses by counting the operation clocks. An interval latch 214 latches the measured value (zero-crossing interval) of the interval counter 212 by the zero-crossing pulse. A data retention flip-flop 216 holds the latch content (the latest zero-crossing interval) of the interval latch 214 by the latch pulse. A data retention flip-flop 218 latches and holds the measured value (the number of counts from the latest zero-cross to the present) of the interval counter 212 by the latch pulse.

An invertor 220 calculates a complement of the target number of tracks from the MPU 30 and the result is loaded to a crossed track number counter 222 in accordance with the load pulse. Since the zero-crossing pulse is applied to the enable terminal EN of the crossed track number counter 222, the number of remaining tracks is counted. A data retention flip-flop 224 holds the number of remaining tracks of the crossed track number counter 222 in accordance with the latch pulse.

In this embodiment, the interval counter 212 counts the interval of the zero-crossing pulses to update the interval latch 214. The complement of the target number of tracks is loaded to the crossed track number counter 222 prior to the seek operation, counts the zero-crossing pulses, and measures the number of remaining tracks.

The MPU 30 generates the latch signal when reading the data to output the latch pulse, and lets the flip-flop 216 hold the latest zero-crossing interval of the interval latch 214. The MPU 30 also lets the flip-flop 218 hold the number of counts up to the present from the latest zero-crossing pulses of the interval counter 212, and lets the flip-flop 224 hold the number of remaining tracks. The MPU 30 reads the data of the flip-flops 216, 218, 224, obtains the actual speed from the inverted number of the latest zero-crossing interval and calculates the target speed from the number of remaining tracks. The number of counts from the latest zero-crossing pulse to the present number of counts is used for position detection for the purpose of speed control at the time of the stop control.

The frequency division ratio of the system clock is changed in accordance with the frequency switch instruction from the MPU 30 for the purpose of accommodating the one-track passage time within the bits of the counter 212 by the use of a high frequency (about 4 MHz) when the zero-crossing interval is short in the high speed operation mode such as during the seek operation, and by using a lower frequency (about 1 MHz) than the frequency at the time of acceleration, when the zero-crossing interval is relatively long.

Seek Control Operation

FIGS. 15A to 15K are waveform diagrams explaining the operation of an embodiment of the present invention. FIG. 15A represents the case where the front edge of the track error signal TES is disturbed by the presence of the ID portion and the mirror portion.

The High time counter 128 (see FIG. 8) of the control signal generation circuit 120 is reset by the corrected on-edge pulse $\overline{ONP}$, and starts counting the High time of the track zero-crossing signal TZC. The high time of this high time counter 128 is always compared with the previous high time held by the flip-flop 132 in the comparators 142, 144 of the window generation circuit 124, and the fall window signal WD is generated with the timing, at which the previous High time has passed away, as the center as shown in FIG. 15E.

In the off-edge generation timer 134 (see FIG. 8), the previous high time held by the flip-flop 132 is loaded by the corrected on-edge pulse $\overline{ONP}$. When the system clocks SCL are counted down and the high time TH has passed away from $\overline{ONP}$, the expected off-edge pulse HFP is generated as shown in FIG. 15H.

Similarly, the low time counter 148 (FIG. 9) of the control signal generation circuit 122 is reset by the off-edge pulse $\overline{OFP}$, and starts counting the low time of the track zero-crossing signals TZC. The low time of the low time counter 148 is always compared with the previous low time TL in the comparators 162, 164 of the window generation circuit 126, and the rise window signal WU is generated at the timing, at which the previous low time has passed away, with the center as shown in FIG. 15C.

In the on-edge generation timer 154 (FIG. 9), the previous low time TL held by the flip-flop 152 is loaded by the off-edge pulse $\overline{OFP}$, and counts down the system clocks SCL. When the low time TL passes away from $\overline{OFP}$, the expected on-edge pulse HNP is generated as shown in FIG. 15G.

When the detected on-edge pulse NP appears in the period other than the period of the rise window WU in the sequence circuit 116 (FIG. 12), it is cut off by the AND gate 128. When the on-edge pulse NP appears within the period of the rise window WU, the expected on-edge pulse HNP is cut off by the AND gate 182 by the low level output of Q of the flip-flop 180. When the detected on-edge pulse NP does not appear within the period of the rise window WU, the expected on-edge pulse HNP passes through the AND gate 182 because of the high level output of Q of the flip-flop 180.

Similarly, when the detected off-edge pulse FP appears in the period other than the period of the fall window WD in the sequence circuit 118 (FIG. 13), it is cut off by the AND gate 196 and when the detected off-edge pulse FP appears within the period of the fall window WD, the expected off-edge pulse HFP is cut off by the AND gate 200 because of the low level output of Q. When the detected off-edge pulse FP does not appear within the period of the fall window WD, the expected off-edge pulse HFP passes through the AND gate 200 because of the high level output of Q of the flip-flop 198.

In this way, as shown in FIGS. 15A to 15K, the detected on-edge pulse NP represented by ⑤ is cut by the rise window WU, the expected on-edge pulse HNP represented by ⑥ is inserted, and the corrected track zero-crossing signal $\overline{TZC}$ can thus be obtained.

FIGS. 16A to 16K and FIGS. 17A to 17I are waveform diagrams for explaining the operation of an embodiment of the present invention. FIGS. 16A to 16K illustrate the case where the front edge of the track error signal TES is somewhat disturbed and FIGS. 17A to 17I illustrate the case where the amplitude of the track error signal TES is disturbed and hence, zero-crossing cannot be detected.

In FIGS. 16A to 16K, the detected on-edge pulse NP represented by ⑤ exists within the period of the rise window WU and is not therefore cut. The expected on-edge pulse HNP at the expected position of ⑥ is cut because the detected on-edge pulse NP of ⑤ first appears within the period of the rise window WU.

When the detected off-edge pulse FP appears after the expected position within the period of the fall window WD as represented by ⑦, the expected off-edge pulse HFP and the detected off-edge pulse FP are output as the off-edge pulse $\overline{OFP}$ after correction, but the flip-flop 124 (FIG. 6) neglects the detected off-edge pulse FP. The low timer counter 148 (FIG. 4) of the control signal generation circuit 122 is once reset by the expected off-edge pulse HFP, but it is again reset by the detected off-edge pulse FP so that the measurement of the low time by the detected off-edge pulse FP becomes possible.

In FIGS. 17A to 17I, the expected off-edge pulse generation timer 134 and the high time measurement timer 128 are reset at ⑤ and by the expected on-edge pulse HNP, the expected on-edge pulse generation timer 154 and the low time measurement timer 148 are reset by the expected off-edge pulse HFP at 6 and 8. Accordingly, the expected edge pulse and the window signal can be generated in succession.

Another Embodiment

Besides the embodiment described above, the present invention can be modified in the following ways.

i) Though the present invention has been described with reference to the opto-magnetic disk system, it can be applied likewise to an optical disk system.

ii) Though the embodiment described above uses both of the on-edge and off-edge pulses of the track zero-crossing signal TZC, correction may be carried out using either of them.

Although the present invention has thus been described with reference to the preferred embodiment thereof, the invention can naturally be changed and modified in various ways without departing from the scope thereof, and such changes and modifications should not be excluded from the scope of the present invention.

As explained above, the present invention provides the following effects.

i) The present invention measures the period of the track zero-crossing signal, generates the window signal and the expected pulse at the expected position of the edge pulse of the next track zero-crossing signal from the period thus measured, and masks the detected pulse by the window signal. Accordingly, the pulses detected at positions other than the expected position can be cut and the excessive track zero-crossing signal TZC can be cut so that the track zero-crossing signal TZC, which is deviated by the disturbed track error signal TES, can be corrected.

ii) When the detected edge pulse does not exist within the window signal, the expected pulse is output and when the detected pulse does exist within the window signal, the detected pulse is output and the corrected track zero-crossing pulse is output. Accordingly, the expected pulse can be inserted at the expected position, and the deviation of the period can be prevented and the actual speed can be accurately detected.

We claim:

1. A method of correcting a raw track zero-crossing signal having a series of edges to produce a corrected track zero-crossing signal, in an optical disk system, comprising the steps of:

detecting the edges of the raw track zero-crossing signal;

successively generating expected edge timing and expected intervals at which edges of the track zero-crossing signal are expected based on past detected edges, the respective edge timing being generated within the respective expected intervals;

allowing detected edges to pass through as edges of the corrected track zero-crossing signal if those edges are detected within the expected intervals;

obstructing detected edges if those edges are detected out of the expected intervals; and adding expected edges, before the respective expected intervals end, as the edges of the corrected track zero-crossing signal at the expected edge timing if edges are not detected within expected intervals corresponding to the expected edge timing, whereby the corrected track zero-crossing signal includes detected edges which are within the expected intervals, and expected edges when the detected edges are obstructed because they are outside of the expected intervals.

2. A method as claimed in claim 1, wherein the edges of the raw track zero-crossing signal, the expected edge timing, and the expected intervals include on-edges and off-edges of the raw track zero-crossing signal, expected on-edge timing and off-edge timing, and expected intervals of on-edges and off-edges, respectively.

3. A method as claimed in claim 1, further comprising the steps of:

detecting periods of the raw track zero-crossing signal;

comparing the detected periods with a predetermined value, allowing edges of the raw track zero-crossing signal to pass through as edges of the corrected track zero-crossing signal if the detected periods are greater than the predetermined value in the comparing step, by inhibiting the obstructing and adding steps when the detected period is greater than the predetermined value.

4. A method as claimed in claim 1, wherein, in the generating step, the expected edge timing and the expected intervals are generated based on the past detected edges that have been allowed to pass through in the allowing step.

5. A circuit for correcting a raw track row-crossing signal having a series of edges to produce a corrected track zero-crossing signal in an optical disk system, comprising:

detecting means for detecting the edges of the raw track zero-crossing signal;

control signal generating means for successively generating expected edge timing and expected intervals at which edges of the track zero-crossing signal are expected based on past detected edges, the respective edge timing being generated within the respective expected intervals, and sequence control means for allowing detected edges to pass through as edges of the corrected track zero-crossing signal if those edges are detected within the expected intervals; for obstructing detected edges if those edges are detected out of the expected intervals, and for adding expected edges, before the respective expected intervals end, as the edges of the corrected track zero-crossing signal at the expected edge timing if edges are not detected within expected intervals corresponding to the expected edge timing.

6. A circuit as claimed in claim 5, wherein the detecting means includes an edge pulse generating circuit outputting a series of detected edge pulses when the edges are detected; wherein the control signal generating means includes an expected edge pulse generating circuit successively outputting expected edge pulses at the expected edge timing, and a window signal generating circuit outputting a window signal indicating the expected intervals, and wherein the sequence control means includes a first gate circuit allowing the detected edge pulses to pass therethrough as edge pulses for the corrected track zero-crossing signal while the window signal is active, and a second gate circuit allowing the expected edge pulses to pass therethrough as edge pulses for the corrected track zero-crossing signal when the detected edge pulse does not appear while the window signal is active.

7. A circuit as claimed in claim 5, wherein the edges of the raw track zero-crossing signal, the expected edge timing, and the expected intervals include on-edges and off-edges of the raw track zero-crossing signal, expected on-edge timing and off-edge timing, and expected intervals of on-edges and off-edges, respectively.

8. A circuit as claimed in claim 5, further comprising:

period detecting means for detecting periods of the raw track zero-crossing signal, and comparison means for comparing the periods detected in the period detecting means with a predetermined means to thereby output a mask signal allowing all edges of the raw track zero-crossing signal to pass through as edges of the corrected track zero-crossing signal if the detected periods are greater than the predetermined value.

9. A circuit as claimed in claim 5, wherein the control signal generating means generates the expected edge timing and the expected intervals based on the past detected edges that have been allowed to pass through the sequence control means.

10. A circuit for correcting a raw signal having a series of edges where a logic level of the signal alters to produce a corrected signal, comprising:

detecting means for detecting the edges of the raw signal;

control signal generating means for successively generating expected edge timing and expected intervals at which edges of the signal are expected based on past detected edges, the respective edge timing being generated within the respective expected intervals; and sequence control means for allowing detected edges to pass through as edges of the corrected signal if those edges are detected within the expected intervals; for obstructing detected edges if those edges are detected out of the expected intervals, and for adding expected edges, before the respective expected intervals end, as the edges of the corrected signal at the expected edge timing if edges are not detected within expected intervals corresponding to the expected edge timing.

11. An optical disk drive for reading and/or writing an optical disk having tracks, comprising:

an optical head generating a light beam irradiating the optical disk, receiving a light signal reflected from the optical disk, and converting the light signal into electrical signals including a track error signal indicating deviation of the irradiating position of the light beam from the tracks;

actuator means for moving the irradiating position;

servo means driving the actuator means;

a comparator generating a raw track zero-crossing signal by slicing the track error signal by a track offset, the raw track zero-crossing signal being at a logic level when track zero-crossing signal is above the track offset and being at another logic level when the track zero-crossing signal is below the track offset;

a signal correction circuit correcting the raw track zero-crossing signal to thereby form a corrected track zero-crossing signal;

a track counter circuit counting a number of tracks crossed by the irradiating position based on the corrected track zero-crossing signal, and measuring a track-crossing interval based on the corrected track zero-crossing signal; and control means controlling the servo means in accordance with the crossed track number and the track-crossing interval from the track counter circuit so that the irradiating position is moved to a designated track; wherein the signal correction circuit includes:

detecting means for detecting edges of the raw track zero-crossing signal where said logic level changes;

control signal generating means for successively generating expected edge timing and expected intervals at which edges of the track zero-crossing signal are expected based on past detected edges, the respective edge timing being generated within the respective expected intervals; and sequence control means for allowing detected edges to pass through as edges of the corrected track zero-crossing signal if those edges are detected within the expected intervals; for obstructing detected edges if those edges are detected out of the expected intervals, and for adding edges, before the respective expected intervals end, as the edges of the corrected track zero-crossing signal at the expected edge timing if edges are not detected within expected intervals corresponding to the expected edge timing.

12. A method of correcting a raw track zero-crossing signal having a series of edges to produce a corrected track zero-crossing signal, in an optical disk system, comprising the steps of:

detecting the edges of the raw track zero-crossing signal;

successively generating expected edge timing and expected intervals at which edges of the track zero-crossing signal are expected based on past detected edges, the respective edge timing being generated within the respective expected intervals;

allowing detected edges to pass through as edges of the corrected track zero-crossing signal if those edges are detected within the expected intervals;

obstructing detected edges if those edges are detected out of the expected intervals; and adding expected edges as the edges of the corrected track zero-crossing signal at the expected edge timing if edges are not detected within expected intervals corresponding to the expected edge timing, whereby the corrected track zero-crossing signal includes detected edges which are within the expected intervals, and expected edges when the detected edges are obstructed because they are outside of the expected intervals, wherein the adding step includes the substeps of:

temporarily adding expected edges at the expected edge timing if edges are not detected before the expected edge timing, and invalidating the temporarily added expected edges if edges are detected after the expected edge timing and within the expected intervals.

13. A circuit for correcting a raw track row-crossing signal having a series of edges to produce a corrected track zero-crossing signal in an optical disk system, comprising:

detecting means for detecting the edges of the raw track zero-crossing signal;

control signal generating means for successively generating expected edge timing and expected intervals at which edges of the track zero-crossing signal are expected based on past detected edges, the respective edge timing being generated within the respective expected intervals, and sequence control means for allowing detected edges to pass through as edges of the corrected track zero-crossing signal if those edges are detected within the expected intervals; for obstructing detected edges if those edges are detected out of the expected intervals, and for adding expected edges as the edges of the corrected track zero-crossing signal at the expected edge timing if edges are not detected within expected intervals corresponding to the expected edge timing, wherein the sequence control means includes:

means for temporarily adding expected edges at the expected edge timing if edges are not detected before the expected edge timing, and means for invalidating the temporarily added expected edges if edges are detected after the expected edge timing and within the expected intervals.

14. A circuit for correcting a raw signal having a series of edges where a logic level of the signal alters to produce a corrected signal, comprising:

detecting means for detecting the edges of the raw signal;

control signal generating means for successively generating expected edge timing and expected intervals at which edges of the signal are expected based on past detected edges, the respective edge timing being generated within the respective expected intervals; and sequence control means for allowing detected edges to pass through as edges of the corrected signal if those edges are detected within the expected intervals; for obstructing detected edges if those edges are detected out of the expected intervals, and for adding expected edges as the edges of the corrected signal at the expected edge timing if edges are not detected within expected intervals corresponding to the expected edge timing, wherein the sequence control means includes:

means for temporarily adding expected edges at the expected edge timing if edges are not detected before the expected edge timing, and means for invalidating the temporarily added expected edges if edges are detected after the expected edge timing and within the expected intervals.

15. An optical disk drive for reading and/or writing an optical disk having tracks, comprising:

an optical head generating a light beam irradiating the optical disk, receiving a light signal reflected from the optical disk, and converting the light signal into electrical signals including a track error signal indicating deviation of the irradiating position of the light beam from the tracks;

actuator means for moving the irradiating position;

servo means driving the actuator means;

a comparator generating a raw track zero-crossing signal by slicing the track error signal by a track offset, the raw track zero-crossing signal being at a logic level when track zero-crossing signal is above the track offset and being at another logic level when the track zero-crossing signal is below the track offset;

a signal correction circuit correcting the raw track zero-crossing signal to thereby form a corrected track zero-crossing signal;

a track counter circuit counting a number of tracks crossed by the irradiating position based on the corrected track zero-crossing signal, and measuring a track-crossing interval based on the corrected track zero-crossing signal; and control means controlling the servo means in accordance with the crossed track number and the track-crossing interval from the track counter circuit so that the irradiating position is moved to a designated track; wherein the signal correction circuit includes:

detecting means for detecting edges of the raw track zero-crossing signal where said logic level changes;

control signal generating means for successively generating expected edge timing and expected intervals at which edges of the track zero-crossing signal are expected based on past detected edges, the respective edge timing being generated within the respective expected intervals; and sequence control means for allowing detected edges to pass through as edges of the corrected track zero-crossing signal if those edges are detected within the expected intervals; for obstructing detected edges if those edges are detected out of the expected intervals, and for adding edges as the edges of the corrected track zero-crossing signal at the expected edge timing if edges are not detected within expected intervals corresponding to the expected edge timing, wherein the sequence control means includes:

means for temporarily adding expected edges at the expected edge timing if edges are not detected before the expected edge timing, and means for invalidating the temporarily added expected edges if edges are detected after the expected edge timing and within the expected intervals.

\* \* \* \* \*